(12) United States Patent
Noguchi et al.

(10) Patent No.: US 11,111,713 B2
(45) Date of Patent: Sep. 7, 2021

(54) OPERATOR FOR VEHICLE SIDE DOOR

(71) Applicant: MITSUI KINZOKU ACT CORPORATION, Kanagawa (JP)

(72) Inventors: Kiichi Noguchi, Kanagawa (JP); Shungo Ikeno, Kanagawa (JP); Shintaro Okawa, Kanagawa (JP); Kazuyuki Sasaki, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 16/725,967

(22) Filed: Dec. 23, 2019

(65) Prior Publication Data

US 2020/0217122 A1    Jul. 9, 2020

(30) Foreign Application Priority Data

Jan. 8, 2019    (JP) .............................. JP2019-001486

(51) Int. Cl.
*E05F 11/00*    (2006.01)
*E05F 15/619*    (2015.01)
(Continued)

(52) U.S. Cl.
CPC ............ *E05F 15/619* (2015.01); *E05F 15/63* (2015.01); *E05Y 2900/531* (2013.01); *F16H 1/28* (2013.01)

(58) Field of Classification Search
CPC ......... E05F 15/63; E05F 15/41; E05F 15/611; E05F 15/619; E05F 15/00; E05Y 2201/00; E05Y 2201/72; E05Y 2201/716; E05Y 2201/692; E05Y 2201/722; E05Y 2900/531; F16H 1/28; F16H 2025/2087; F16H 3/00
(Continued)

(56) References Cited

U.S. PATENT DOCUMENTS 6,216,394 B1 * 4/2001 Fenelon ................ E05F 15/689
49/349
6,389,753 B1 * 5/2002 Fenelon ................ E05F 11/423
185/40 R
(Continued)

FOREIGN PATENT DOCUMENTS

JP      2002-087065 A    3/2002
JP      2005-232752 A    9/2005
(Continued)

*Primary Examiner* — Chi Q Nguyen
(74) *Attorney, Agent, or Firm* — McDermott Will & Emery LLP (57) ABSTRACT

An operator for a vehicle side door including a metallic outer panel, a metallic inner panel, and a door glass partitioning a storage space between a downward movement locus line of the door glass and the metallic inner panel, the operator including: a drive unit provided in the storage space such that the drive unit overlaps with the downward movement locus line of the door in a width direction of the door; a pinion gear fixed to an output shaft of the drive unit; a rack including a rack gear configured to engage with the pinion gear; and a connecting arm pivotally supported on a vehicle body side bracket fixed to the vehicle body, the connecting arm being connected to a front end of the rack, wherein the side door moves in a direction of opening the door and closing the door in accordance with the movement of the rack.

8 Claims, 10 Drawing Sheets

(51) Int. Cl.
*E05F 15/63* (2015.01)
*F16H 1/28* (2006.01)

(58) Field of Classification Search
USPC ......... 49/359, 349, 375, 348, 350, 351, 372, 49/374, 340, 358
See application file for complete search history.

(56) References Cited

U.S. PATENT DOCUMENTS

| | | | | |
|---|---|---|---|---|
| 8,069,611 | B2* | 12/2011 | Kitayama | E05F 5/003 49/348 |
| 8,650,800 | B2* | 2/2014 | Anderson | E05F 11/445 49/351 |
| 10,498,527 | B2* | 12/2019 | Shinoda | H04L 7/04 |
| 2004/0111970 | A1* | 6/2004 | Fenelon | E05F 11/525 49/349 |
| 2004/0187391 | A1* | 9/2004 | Fenelon | E05F 15/41 49/375 |
| 2005/0160675 | A1* | 7/2005 | Fenelon | E05F 11/423 49/375 |
| 2007/0151158 | A1* | 7/2007 | Fenelon | E05F 11/423 49/349 |
| 2009/0260292 | A1* | 10/2009 | Hansch | E05F 1/105 49/340 |
| 2011/0266080 | A1* | 11/2011 | Schmitt | E05C 17/006 180/89.1 |
| 2012/0198773 | A1* | 8/2012 | Younce | E06B 11/026 49/359 |
| 2019/0112859 | A1* | 4/2019 | Cumbo | F16H 1/28 |

FOREIGN PATENT DOCUMENTS

| | | |
|---|---|---|
| JP | 2017-128940 A | 7/2017 |
| JP | 2018-505326 A | 2/2018 |
| JP | 2018-066226 A | 4/2018 |
| WO | 2016/164023 A1 | 10/2016 |

* cited by examiner

INDOOR SIDE ← → OUTDOOR SIDE

OPERATOR FOR VEHICLE SIDE DOOR

The present application claims priority to and incorporates by reference the entire contents of Japanese Patent Application No. 2019-001486 filed in Japan on Jan. 8, 2019.

BACKGROUND

The present disclosure relates to an operator for a vehicle side door.

In common operators for vehicle side doors, when a door latch device is unlatched, a drive unit causes a side door to move to a position at which the door is fully opened so as to open the door, and, when a door closing switch is operated in a state in which the door is open, the drive unit is activated to close the door, thereby moving the side door so as to close the door. A side door including an operator is sometimes referred to as a "power hinge door". There are various settings as to conditions and timing for a drive unit of an operator to start up so as to open a door, as well as conditions and timing for moving the door so as to close the door.

Japanese Patent Application Laid-open No. 2017-128940 and Japanese Laid-open Patent Publication (Translation of PCT Application) No. 2018-505326 both disclose a structure in which a drive unit of an operator is attached to an inner space of a side door. The drive unit attached to the inside of the side door is connected through a connecting mechanism to a bracket of a vehicle body, and power of the drive unit causes the connecting mechanism to expand and contract, thereby moving the side door with respect to the vehicle body so as to open and close the door.

Japanese Patent Application Laid-open No. 2002-087065 discloses an operator for a back door of a vehicle. A drive unit of this operator is arranged in a storage space that is provided between a roof panel and a roof trim on a vehicle rear end part, and a bracket of a back door and the drive unit are linked through a link mechanism so as to open and close the back door with power of the drive unit.

The drive unit in Japanese Patent Application Laid-open No. 2017-128940 and Japanese Laid-open Patent Publication (Translation of PCT Application) No. 2018-505326 is too big to be provided inside a side door, and requires a storage space approximately equal to a thickness of the side door in view of an operating state. Thus, when there is a lifting and lowering door grass, a drive unit cannot be provided at a position where the drive unit and the door glass overlap with each other in a width direction of the door. In order to avoid this kind of restriction, in Japanese Patent Application Laid-open No. 2017-128940 and Japanese Laid-open Patent Publication (Translation of PCT Application) No. 2018-505326, a countermeasure for offsetting a front side guide rail that guides the lifting and lowering of a door glass to the rear based on a vehicle body as much as possible, securing a wide storage space between the front side of the front side guide rail and a front end edge of a side door, and arranging a drive unit in the storage space has been applied. However, in this configuration, a rear offset amount of the front side guide rail on a rear side door becomes very large and a door glass for the rear side door cannot have a size of practical use.

The drive unit in Japanese Patent Application Laid-open No. 2002-087065 is a large output type drive unit for a back door that is opened and closed centering around a door hinge of a horizontal shaft. The drive unit is not suitable for being arranged in a narrow inner space of a side door, and a speed reduction gear group provided between a motor and a pinion gear is disposed so as to spread in a radiation direction of a motor shaft. Thus, miniaturization has not been taken into account.

SUMMARY

In some embodiments, in an operator for a vehicle side door rotatably attached to a vehicle body by a pair of upper and lower door hinges, the vehicle side door including a metallic outer panel, a metallic inner panel, and a door glass configured to be movable in a vertical direction and partitioning a storage space between a downward movement locus line of the door glass and the metallic inner panel, the operator includes: a drive unit provided in the storage space such that the drive unit overlaps with the downward movement locus line of the door in a width direction of the door; a pinion gear fixed to an output shaft of the drive unit; a rack including a rack gear, the rack extending in a fore- and aft direction of the side door and the rack gear being configured to engage with the pinion gear; and a connecting arm pivotally supported on a vehicle body side bracket fixed to the vehicle body, the connecting arm being connected to a front end of the rack, wherein the side door moves in a direction of opening the door when the rack moves forward by the rotation of the pinion gear and the side door moves in a direction of closing the door when the rack moves backward by rotation of the pinion gear.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Exemplary embodiments are described with reference to the accompanying drawings. An operator 10 for a vehicle side door according to the present disclosure includes a drive unit 11 and a connecting mechanism 12. The drive unit 11 is arranged in a storage space 15 inside a side door 14 of a vehicle 13.

Figure 2:
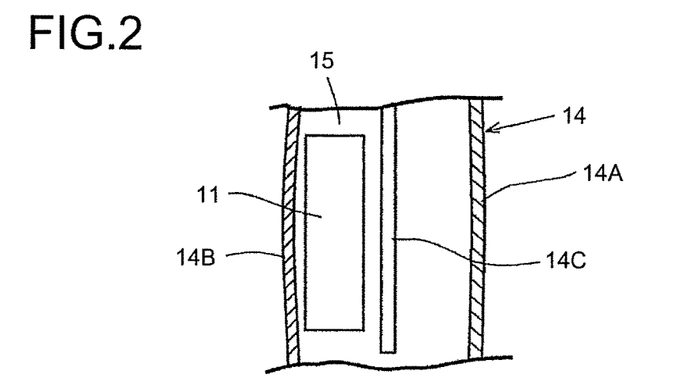
FIG. 2 is a schematic vertical sectional view of a side door illustrating an attachment position of a drive unit of the operator.

The side door 14 includes a metallic outer panel 14A and a metallic inner panel 14B, and the metallic inner panel 14B has preferably a trim panel (not illustrated) attached thereto. The side door 14 includes a door glass 14C that is lifted and lowered by a lifting and lowering mechanism 16. The front edge and the rear edge of the door glass 14C are slidably sandwiched by a front guide rail 14D and a rear guide rail 14E, and the door glass 14C is lifted and lowered between the metallic outer panel 14A and the metallic inner panel 14B.

When lowered, the door glass 14C divides a space between the metallic outer panel 14A and the metallic inner panel 14B into substantially halves. The storage space 15 is a space partitioned by the door glass 14C (including an extended line of a downward movement locus of the door glass 14C) and the metallic inner panel 14B.

Figure 1:
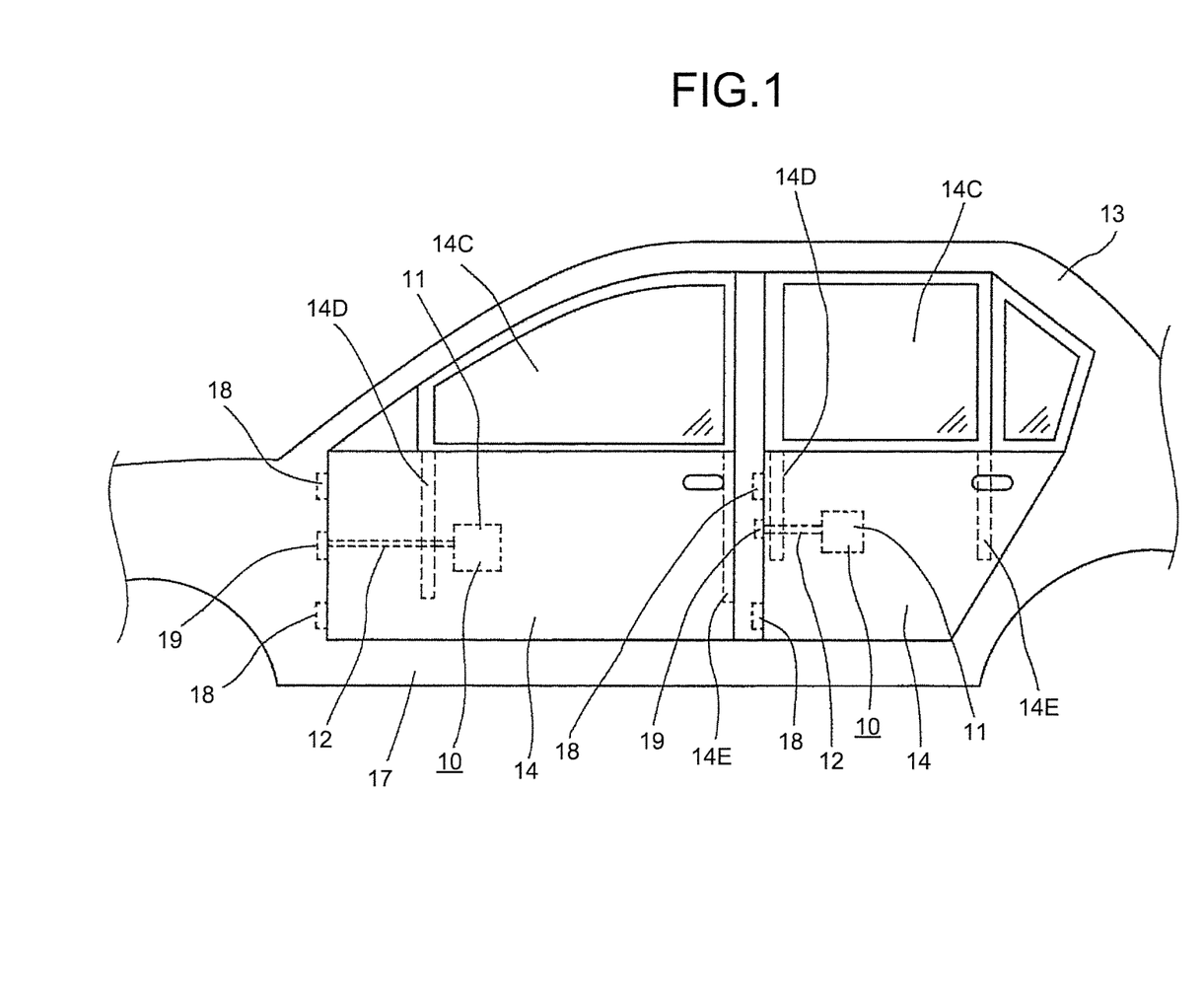
FIG. 1 is a schematic side view of a vehicle having a side door provided with an operator according to an embodiment.
Figure 3:
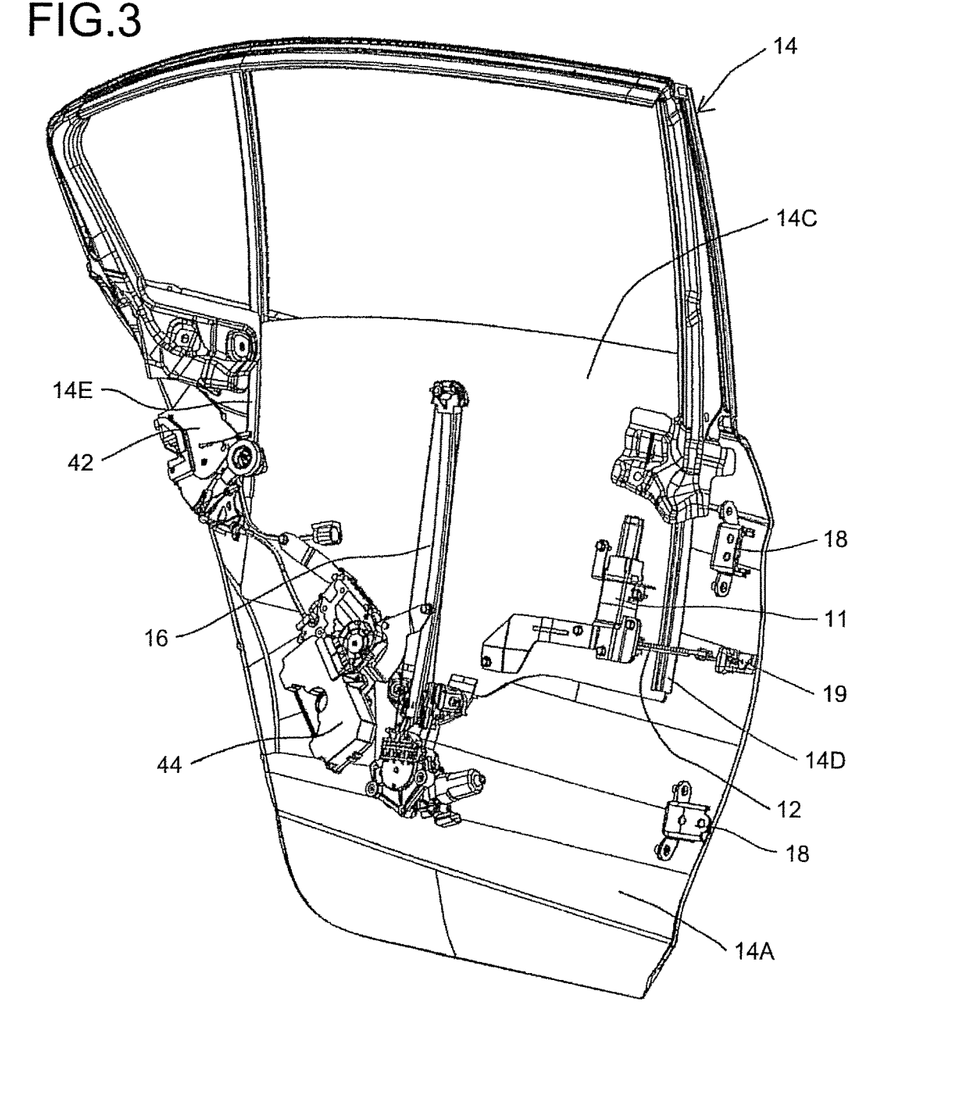
FIG. 3 is a perspective view illustrating the internal components of the side door with an inside panel removed therefrom.

The side door 14 is rotatably attached to a vehicle body 17 by a pair of upper and lower door hinges 18. To the vehicle body 17, a vehicle body side bracket 19 is fixed. The vehicle body side bracket 19 is arranged between the upper and lower door hinges 18. The vehicle body side bracket 19 is connected through the connecting mechanism 12 to the drive unit 11. When power from the drive unit 11 is transmitted to the vehicle body side bracket 19, the side door 14 is rotated about the door hinges 18 in a direction of opening the door or in a direction of closing the door. At this time, because the vehicle body side bracket 19 is arranged midway between the upper and lower door hinges 18, the power from the drive unit 11 is transmitted to the vehicle body 17 efficiently and smoothly.

Figure 6:
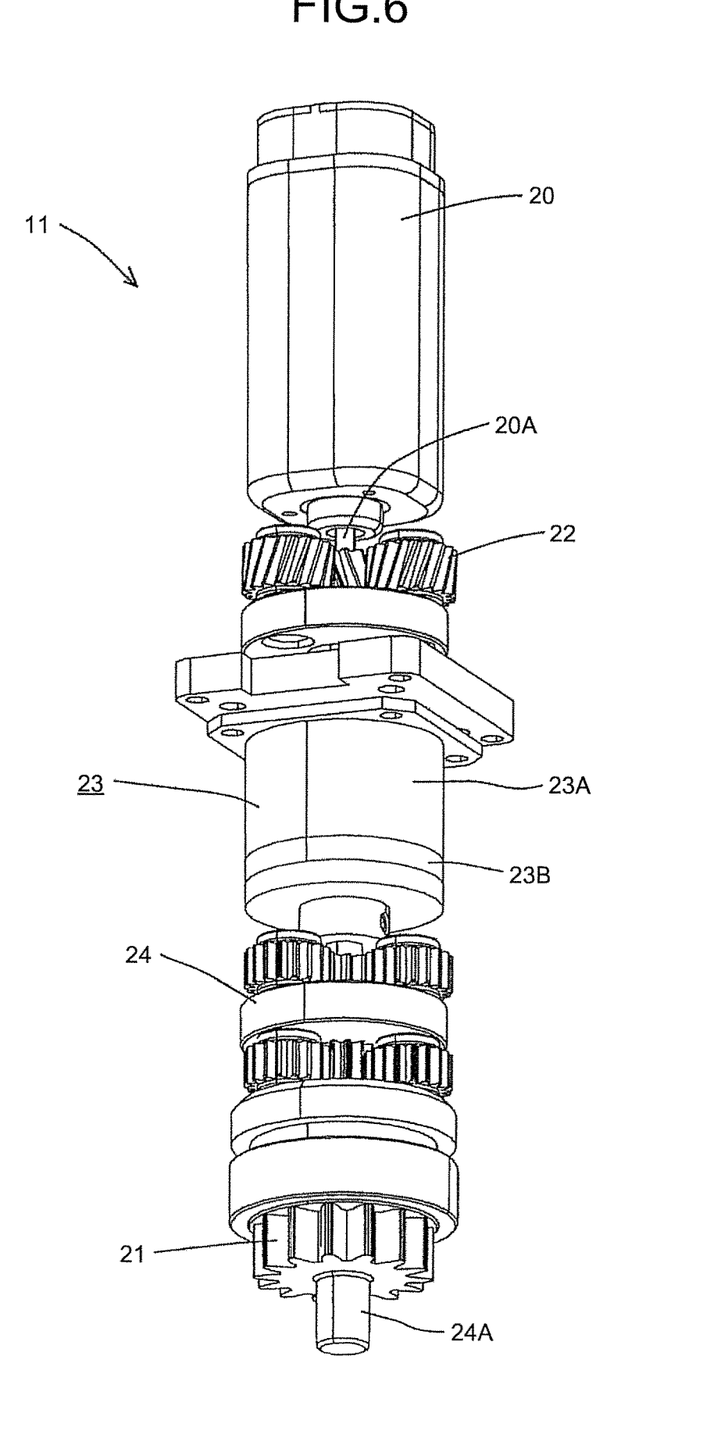
FIG. 6 is a perspective view schematically illustrating the internal components of the drive unit.

The drive unit 11 has a motor 20 arranged at the top thereof and a pinion gear 21 serving as an output gear arranged at the bottom thereof. Output from the motor 20 is transmitted to a first deceleration part 22 located therebelow. For the first deceleration part 22, a planetary gear mechanism is preferably used.

Output from the first deceleration part 22 is transmitted through a brake part 23 located therebelow to a second deceleration part 24. The brake part 23 has a brake assembly 23A and an armature 23B. The brake part 23 is preferably a spring actuated type electromagnetic brake, and a permanent magnet is used for braking. In the brake part 23, the armature 23B is normally attracted by the permanent magnet, whereby the brake is in an actuated state, and a predetermined braking resistance can be given to the side door 14. The braking resistance of the brake part 23 is released by applying voltage to the brake assembly 23A, and the brake is freed. The pinion gear 21 is fixed to an output shaft 24A of the second deceleration part 24. For the second deceleration part 24, a planetary gear mechanism is preferably used.

Figure 5:
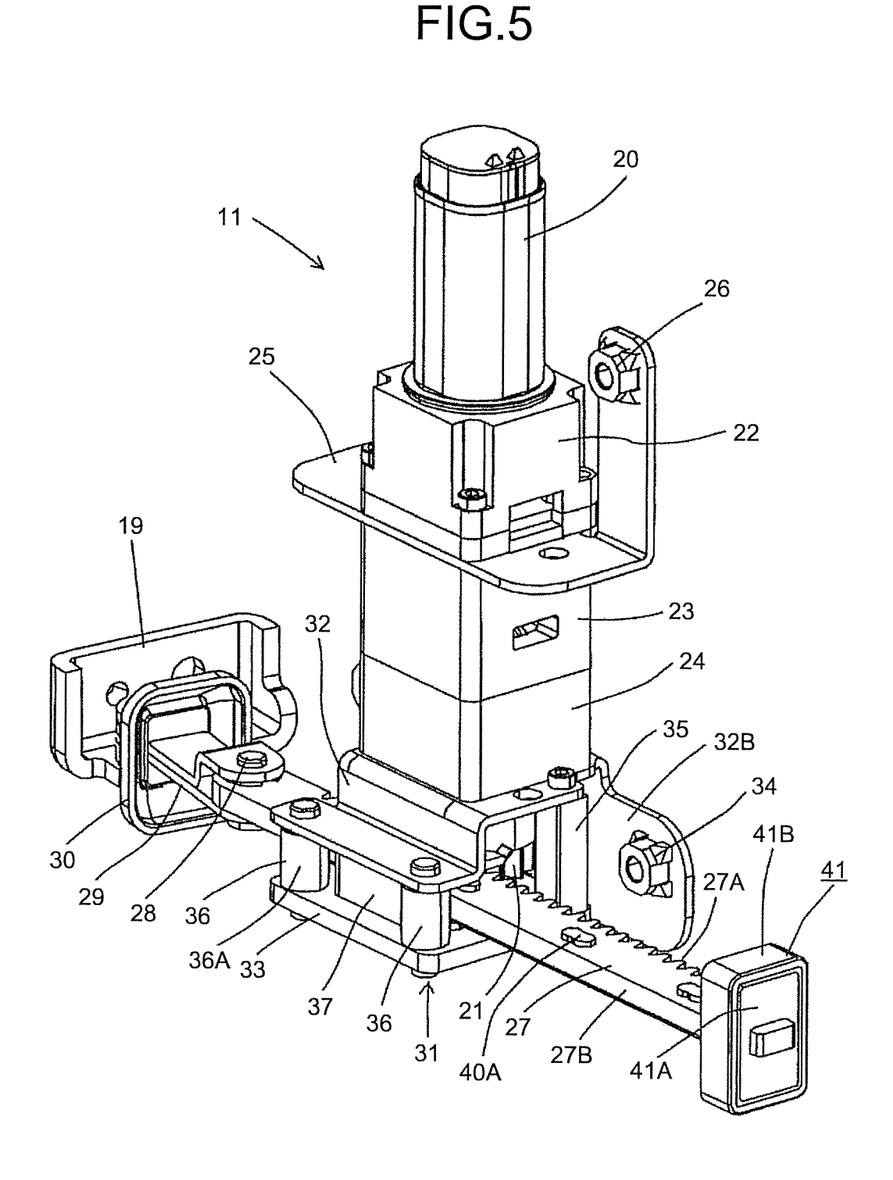
FIG. 5 is an overall perspective view of the drive unit of the operator.

The drive unit 11 takes on a linear shape extending vertically, and has the motor 20, the first deceleration part 22, the brake part 23, and the second deceleration part 24 aligned vertically, thereby minimizing a displacement in a lateral direction (horizontal direction). This structure allows the drive unit 11 to be an elongated cylindrical drive unit extending vertically, and facilitates storage of the drive unit 11 in the storage space 15 having a small width.

More preferably, the drive unit 11 has a driveline from a motor shaft 20A of the motor 20 through the output shaft 24A, to which the pinion gear 21 is fixed, arranged in a line centered on the motor shaft 20A. For example, when a planetary gear mechanism is used for the deceleration parts, a shaft of a sun gear is aligned with a shaft core of the motor shaft 20A. This structure enables the drive unit 11 to have a further reduced size in a radial direction of the motor shaft 20A.

Figure 4:
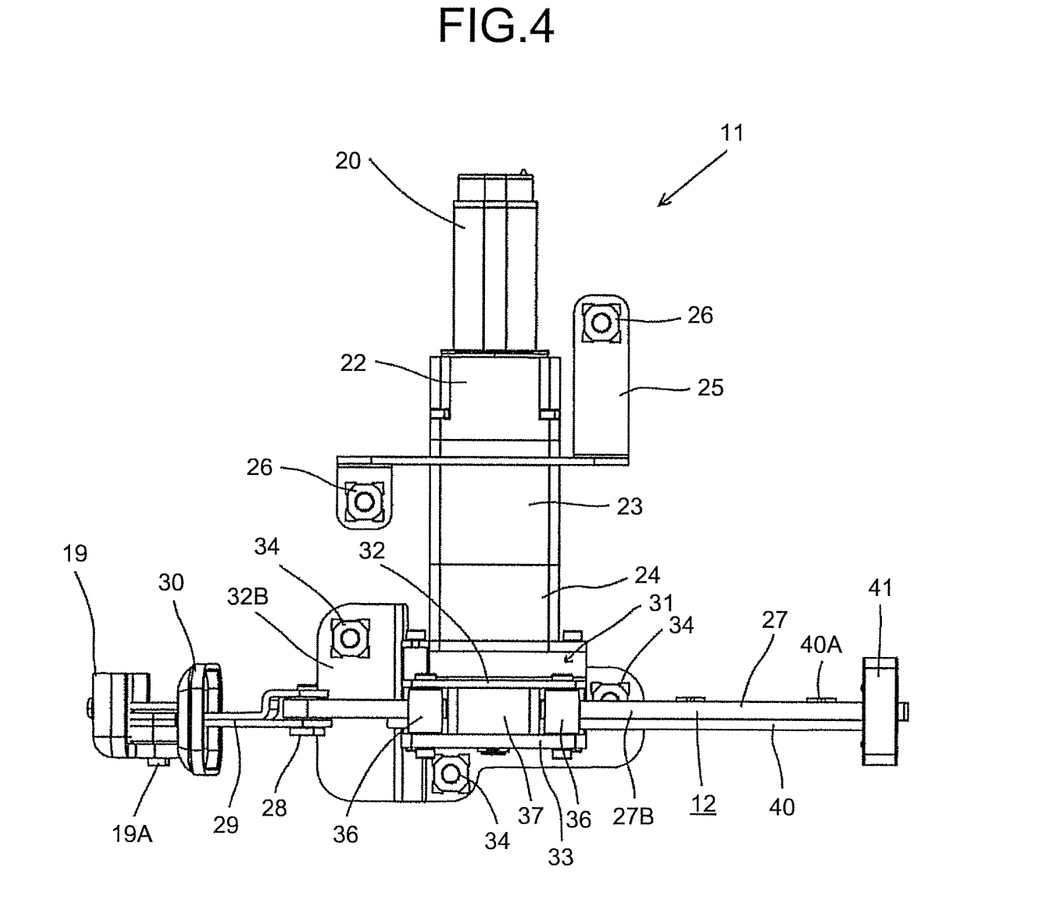
FIG. 4 is a front view of the drive unit of the operator when viewed from the outdoor side.

An upper bracket 25 of the drive unit 11 is fixed to the metallic inner panel 14B with a fastener 26.

Figure 7:
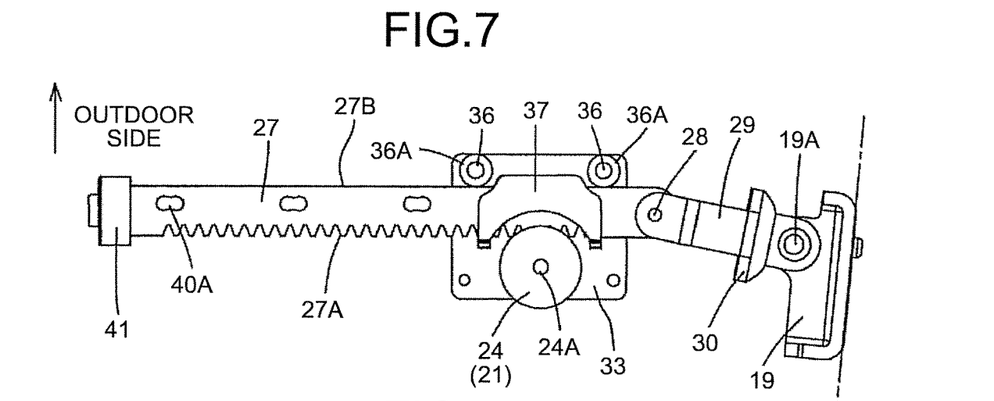
FIG. 7 is a plan view of a vehicle body side bracket, a pinion gear of the drive unit, and a rack in a state in which the door is closed.
Figure 8:
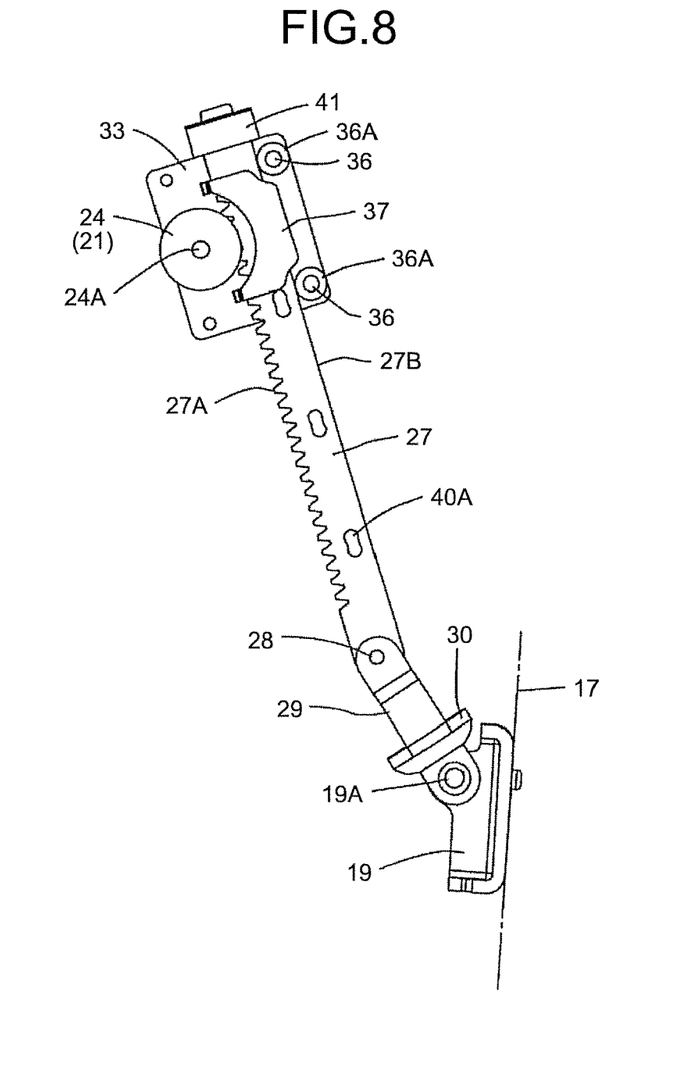
FIG. 8 is a plan view of the rack of FIG. 7 in a state in which the rack is moved so as to open the door.

A rack gear 27A formed on a rack 27 of the connecting mechanism 12 is engaged with the pinion gear 21. The rack 27 extends horizontally in a fore-and-aft direction of the door, a front end of the rack 27 passes through an opening (not illustrated) of a door front panel (not illustrated) to protrude forward, and the front end is pivotally supported on a rotating end of a connecting arm 29 by a connecting shaft 28. A base end of the connecting arm 29 is pivotally supported on the vehicle body side bracket 19 by a bracket shaft 19A. The opening of the door front panel is shielded by a cosmetic cover 30, for example.

Figure 9:
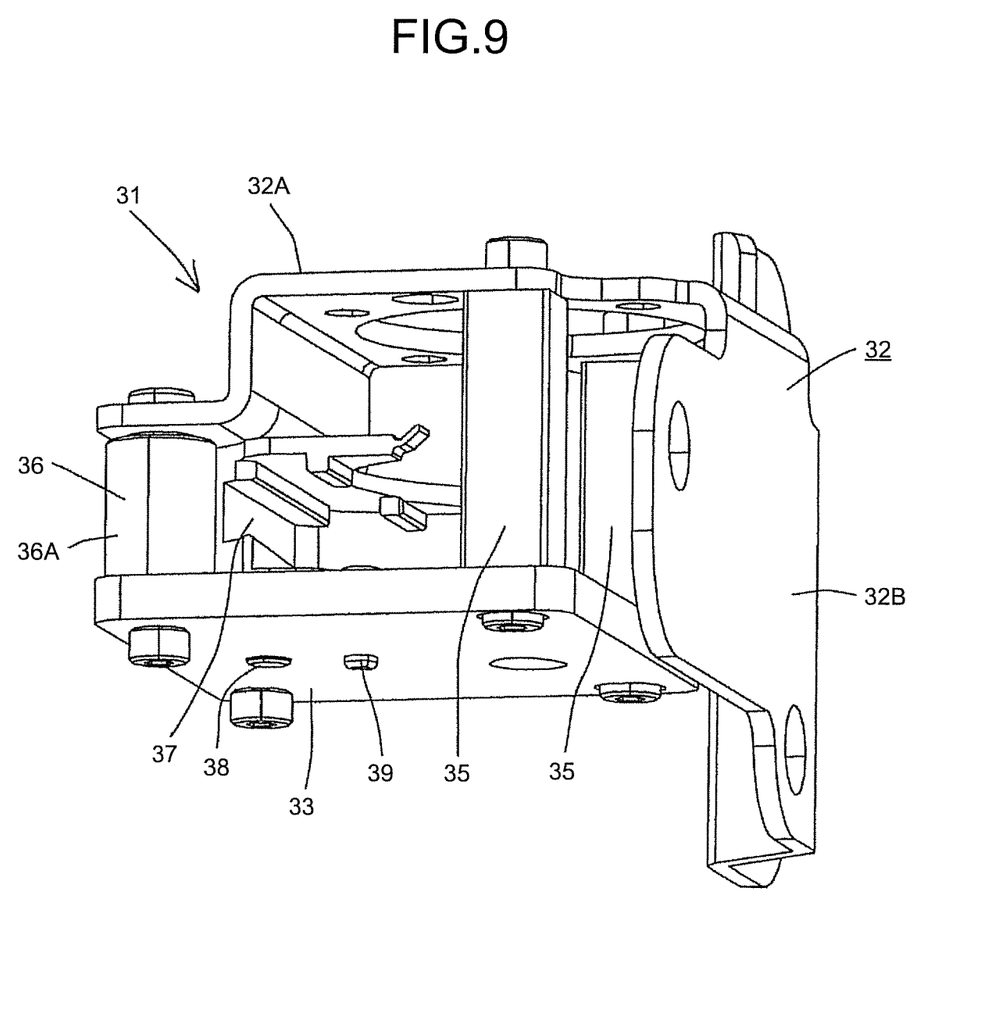
FIG. 9 is a perspective view of an engagement holding unit that holds the engagement of a rack gear and the pinion gear.

A part in which the pinion gear 21 and the rack gear 27A are engaged with one another is held inside an engagement holding unit 31. The engagement holding unit 31 prevents a gap in a pitch between the pinion gear 21 and the rack gear 27A and a displacement of the engagement position of the pinion gear 21 and the rack gear 27A in a shaft center direction of the output shaft 24A.

Figure 10:
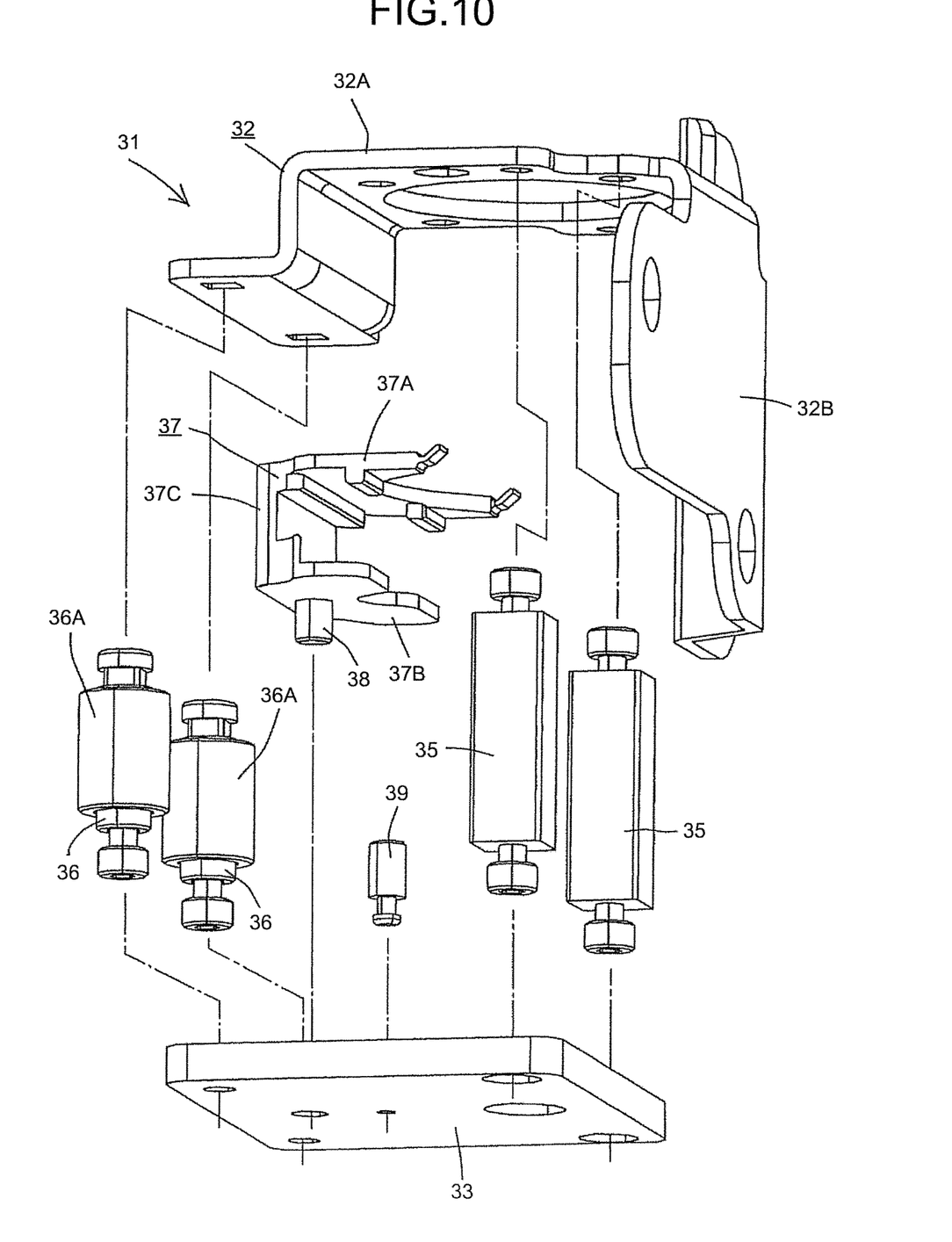
FIG. 10 is an exploded perspective view of the engagement holding unit.

The engagement holding unit 31 includes a substantially L-shaped upper cover 32 and a rectangular flat-shaped lower base 33. A horizontal part 32A of the upper cover 32 is fixed to the lower part of the drive unit 11 (the second deceleration part 24). A bent part 32B of the upper cover 32 is arranged on the indoor side and is fixed to the metallic inner panel 14B with a fastener 34.

The horizontal part 32A and the lower base 33 are fixed with four vertical pillars 35, 35, 36, 36 at predetermined spacings. Two vertical pillars 35, 35 on the indoor side may be normal prisms, whereas two vertical pillars 36, 36 on the outdoor side have rotary rollers 36A, 36A pivotally mounted to the outer periphery thereof. The rotary rollers 36A, 36A have a non-gear face 27B of the rack 27 brought into contact therewith.

Figure 11:
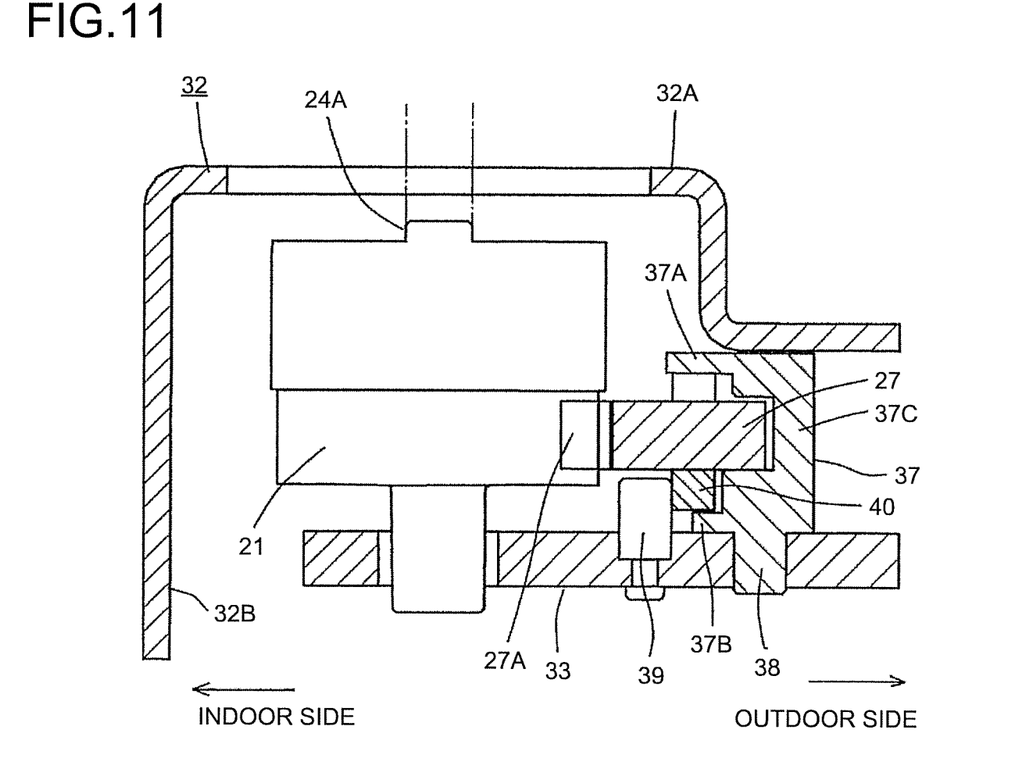
FIG. 11 is a vertical sectional view of the engagement holding unit.

A rack guide body 37 is pivotally supported on the lower base 33 by a guide support shaft 38. The rack guide body 37 includes a top face 37A, a bottom face 37B, and a side face 37C that connects the outdoor side of the top face 37A and the bottom face 37B to one another. As illustrated in FIGS. 10 and 11, a hold-down pin 39 that stands upward is implanted in the lower base 33. The hold-down pin 39 is arranged on a line connecting the output shaft 24A and the guide support shaft 38.

The rack 27 is restricted from moving in an up-and-down direction by the top face 37A and the bottom face 37B of the rack guide body 37.

The rack 27 is moved forward (in the direction of opening the door) or backward (in the direction of closing the door) by rotation of the pinion gear 21. The rack 27 swings slightly about the connecting shaft 28 at the front end during the movement. The swing is absorbed because the rack guide body 37 swings about the guide support shaft 38, so that disengagement of the rack gear 27A and the pinion gear 21 is avoided.

Figure 12:
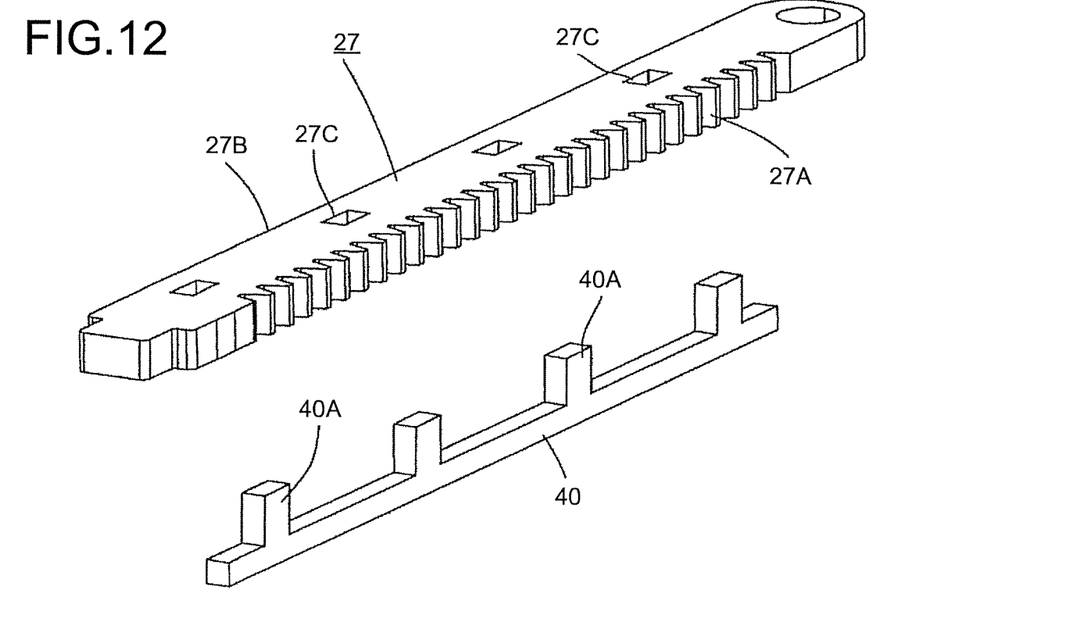
FIG. 12 is an exploded perspective view of the rack.

A steel rack slider 40 is attached to the rack 27. Preferably, upper projections 40A of the rack slider 40 are inserted into through holes 27C of the rack 27, and then caulked to be fixed to the rack 27. The rack slider 40 extends like a rail on a bottom face of the rack 27 in a longitudinal direction of the rack 27.

The rotary rollers 36A, 36A come into contact with the non-gear face 27B of the rack 27 from the outdoor side, the hold-down pin 39 of the lower base 33 comes into contact with the rack slider 40 of the rack 27 from the indoor side, as illustrated in FIG. 11, which facilitates the smooth movement of the rack 27 in a fore-and-aft direction without generating a backlash.

A contact stopper 41 is fixed to a rear end of the rack 27. The contact stopper 41 is made up of a central steel member 41A and an elastic body 41B that surrounds the outer periphery of the steel member 41A. The steel member 41A is fitted into the rear end of the rack 27, and then is fixed by welding.

When the rack 27 is moved in the direction of opening the door (forward) and the side door 14 reaches a position at which the door is fully opened, the elastic body 41B of the contact stopper 41 comes into contact with the engagement holding unit 31, preferably with a structure, such as the upper cover 32 and the lower base 33. Thus, the position of the side door 14 at which the door is fully opened is defined by mechanical contact, and structural deformation is also prevented of the drive unit 11, the connecting mechanism 12, and the door hinges 18 resulting from the side door 14 moving beyond the position at which the door is fully opened.

A spring actuated type electromagnetic brake is employed for the brake part 23 of the drive unit 11, and the brake is actuated in a non-energized standby state. Braking force (holding torque) by the brake part 23 preferably generates two types of brakes: a strong brake during non-energization and a weak brake when energization is controlled. The strong brake is set to the same degree as a braking resistance (50 Nm) when the side door is temporarily held by a common check link. Thus, the strong brake of the brake part 23 can complement the function of a check link in the present embodiment, so that a check link can be omitted.

In a state in which the door is closed with a door latch device 42 (FIG. 3) engaged with a striker, the brake part 23, which is in a non-energized standby state, generates a strong brake. When a passenger unlatches the door latch device 42 by operation of an inside handle 43 from the inside of the vehicle in a state in which the door is closed, the brake part 23 is energized and the brake is turned off in conjunction with the foregoing operation, the side door 14 is pushed out by a seal reaction force or the like from a position at which the door is closed, and the passenger also pushes the side door 14 from the indoor in the direction of opening the door, thereby further moving the side door 14 in the direction of opening the door.

When the side door 14 is moved from the position at which the door is closed, in the direction of opening the door, the brake part 23 releases the brake, which sometimes causes the side door 14 to be opened suddenly and unexpectedly as a consequence of a tilt of the vehicle 13 to the front, rear, and sides, and strong winds, for example. As a countermeasure, when the side door 14 is moved to a predetermined position at which the door is temporarily opened, the brake part 23 generates a weak brake with control of energization, thereby preventing the side door 14 from being opened suddenly beyond the position at which the door is temporarily opened.

Figure 13:
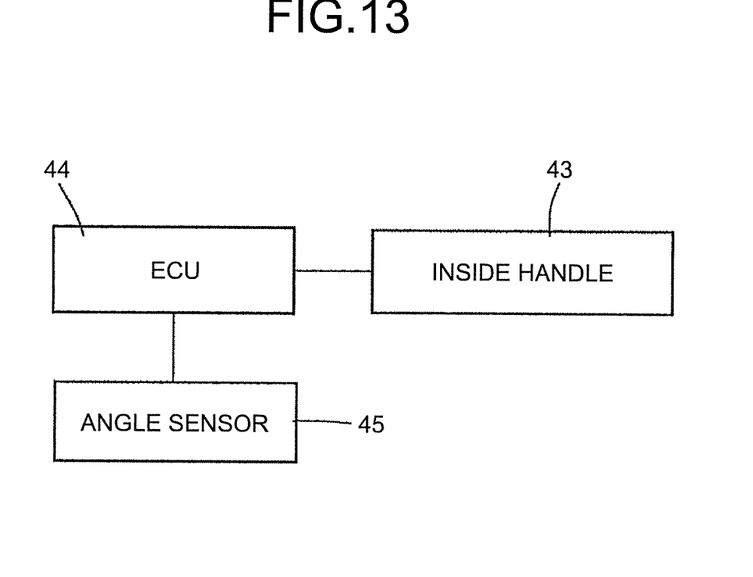
FIG. 13 is a block circuit diagram.

The position of the side door 14 at which the door is temporarily opened is preferably at an opening angle of the door of approximately ten degrees, and the angle corresponds to opening of the door equivalent to the thickness of the side door 14. The position of the side door 14 at which the door is temporarily opened is detected by an angle sensor 45 connected to an engine control unit (ECU) 44, for example.

When the side door 14 reaches the position at which the door is temporarily opened, the brake part 23 generates a weak brake for about one to two seconds. It is desirable that a holding force of the weak brake acting on the side door 14 is set to be moderate in such a manner that the passenger does not feel a sense of discomfort when pushing the side door 14 to the outside in a series of operations of opening the door.

Application of the weak brake to the side door 14 at the position at which the door is temporarily opened can be limited to when the passenger performs operations of opening the door using the inside handle 43 from the indoor. When performing operations of opening the door using an outside handle from the outdoor, an operating person is right outside the side door 14, which reduces the need to apply the weak brake to the side door 14. Also, when the side door 14 passes through the position at which the door is temporarily opened so as to close the door, the weak brake is not applied to the side door 14.

When the side door 14 is moved in the direction of opening the door beyond the position at which the door is temporarily opened, the brake part 23 applies a strong brake to the side door 14 at a predetermined position. Preferably, when the side door 14 is opened at approximately 25 degrees, the side door 14 is given a predetermined opening resistance of the door by the strong brake. This produces the same effect as a stepping resistance given to a side door by a common check link.

A strong brake is optionally applied to the side door 14 by bringing the brake part 23 into a non-energized state. Consequently, the brake part 23 is configured to, when the side door 14 has been maintained at the same angle for a predetermined time frame, maintain the side door 14 at the given opening angle of the door by generating a strong brake.

In the present disclosure, the drive unit 11 is disposed in the storage space 15 between the door glass 14C and the metallic inner panel 14B, whereby the rear side door rationally incorporates the operator without receiving effect of the door glass 14C.

Moreover, in the present disclosure, power from the drive unit 11 can be efficiently and smoothly transmitted to the vehicle body 17.

Moreover, in the present disclosure, the drive unit 11 and the vehicle body side bracket 19 can be set to the same horizontal level, whereby the drive unit 11 can be linked with the vehicle body side bracket 19 through the horizontal rack 27 and power from the drive unit 11 can be efficiently and smoothly transmitted to the vehicle body 17.

Moreover, in the present disclosure, stepping resistance of the side door 14 can be appropriately changed with weak brakes and strong brakes.

Moreover, in the present disclosure, when the side door 14 is manually opened from the indoor, weak brakes are applied to the side door 14 at a position at which the door is temporarily opened, whereby the side door 14 can be prevented from being abruptly opened against the operating person's will.

Moreover, in the present disclosure, applying weak brakes to the side door 14 at a position at which the door is temporarily opened can be omitted at the time of door closing operation, whereby door closing operation can be performed without uncomfortable feelings.

Moreover, in the present disclosure, the drive unit 11 is aligned vertically, whereby the drive unit 11 can be easily assembled to the storage space 15.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operator for a vehicle side door, the operator comprising:
   a drive unit provided in a storage space between a downward movement locus line of a door glass that is movable in a vertical direction and a metallic inner panel of the side door, such that the drive unit overlaps with the downward movement locus line of the door glass in a width direction of the side door;
   a pinion gear fixed to an output shaft of the drive unit;
   a rack including a rack gear, the rack extending in a fore-and aft direction of the side door and the rack gear being configured to engage with the pinion gear; and
   a connecting arm pivotally supported on a vehicle body side bracket fixed to a vehicle body, the connecting arm being connected to a front end of the rack, wherein
   the side door moves in a direction of opening the side door when the rack moves forward by rotation of the pinion gear and the side door moves in a direction of closing the door when the rack moves backward by rotation of the pinion gear.

2. The operator for a vehicle side door according to claim 1, wherein the vehicle body side bracket is disposed between a pair of upper and lower door hinges configured to rotatably attach the side door to the vehicle body.

3. The operator for a vehicle side door according to claim 1, wherein the rack is horizontally disposed.

4. The operator for a vehicle side door according to claim 1, wherein the drive unit includes a brake part configured to generate weak brakes and strong brakes.

5. The operator for a vehicle side door according to claim 4, wherein, when a door latch device is unlatched by operation of an inside handle and the side door is temporarily opened, the brake part generates the weak brakes for a predetermined time.

6. The operator for a vehicle side door according to claim 5, wherein, when the side door moves from a door opening position to a door closing direction and the side door is temporarily opened, the brake part does not generate the weak brakes.

7. The operator for a vehicle side door according to claim 1, wherein the drive unit includes a motor, a deceleration part, and a brake part that are aligned vertically.

8. The operator for a vehicle side door according to claim 7, wherein a first shaft core of the output shaft is aligned with a second shaft core of a motor shaft of the motor.

* * * * *